(12) United States Patent
Shi et al.

(10) Patent No.: US 12,219,481 B2
(45) Date of Patent: Feb. 4, 2025

(54) METHOD AND APPARATUS FOR WAKING UP SMART DEVICE, SMART DEVICE AND MEDIUM

(71) Applicant: BEIJING XIAOMI MOBILE SOFTWARE CO., LTD., Beijing (CN)

(72) Inventors: Runyu Shi, Beijing (CN); Lin Zhang, Beijing (CN); Yuqing Hua, Beijing (CN); Song Mei, Beijing (CN); Wei Lu, Beijing (CN); Naichao Guo, Beijing (CN); Kai Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 350 days.

(21) Appl. No.: 17/203,849

(22) Filed: Mar. 17, 2021

(65) Prior Publication Data
US 2021/0410065 A1 Dec. 30, 2021

(30) Foreign Application Priority Data
Jun. 24, 2020 (CN) .......................... 202010589348.4

(51) Int. Cl.
*H04B 11/00* (2006.01)
*H04W 52/02* (2009.01)

(52) U.S. Cl.
CPC ........ *H04W 52/0229* (2013.01); *H04B 11/00* (2013.01)

(58) Field of Classification Search
CPC ....... G06F 3/167; G06F 9/4418; G10L 15/02; G10L 15/22; G10L 2015/223;
(Continued)

(56) References Cited

U.S. PATENT DOCUMENTS

2003/0235291 A1* 12/2003 Sauvage ................ H04Q 1/457
  379/386
2016/0043895 A1* 2/2016 Hwang ............... H04M 7/1295
  370/338
(Continued)

FOREIGN PATENT DOCUMENTS

CN 110600058 A 12/2019
EP 3453163 A1 3/2019

OTHER PUBLICATIONS

European Patent Application No. 21165365.4, extended search and opinion dated Sep. 23, 2021, 17 pages.
(Continued)

*Primary Examiner* — Jay P Patel
*Assistant Examiner* — Shehab A Alawdi
(74) *Attorney, Agent, or Firm* — Cozen O'Connor

(57) ABSTRACT

A method for waking up a smart device includes receiving sound information; determining whether the sound information includes a multi-frequency tone; and when the sound information includes the multi-frequency tone, waking up a preset function of the smart device based on the multi-frequency tone. A device for waking up a smart device as well as a smart device incorporating the device includes processing elements for performing the method. A non-transitory computer-readable storage medium stores computer instructions to cause processing elements to perform the method for waking up a smart device.

8 Claims, 12 Drawing Sheets

(58) Field of Classification Search
CPC .............. H04B 11/00; H04W 52/0229; H04W 52/0235; Y02D 30/70
See application file for complete search history.

(56) References Cited

U.S. PATENT DOCUMENTS

| | | |
|---|---|---|
| 2018/0054821 A1* | 2/2018 | Sun .................... H04W 72/0453 |
| 2019/0110278 A1* | 4/2019 | Liu ........................ H04W 72/23 |
| 2019/0188549 A1* | 6/2019 | Uchimura .......... G06K 19/0723 |
| 2019/0237097 A1 | 8/2019 | Jiao et al. |
| 2019/0261342 A1* | 9/2019 | Zhang ................. H04W 72/046 |
| 2019/0288807 A1* | 9/2019 | Zhang ................. H04B 7/0456 |

OTHER PUBLICATIONS

Chinese Patent Application No. 202010589348.4, Office Action dated Dec. 2, 2022, 8 pages.
Chinese Patent Application No. 202010589348.4, English translation of Office Action dated Dec. 2, 2022, 16 pages.

\* cited by examiner

METHOD AND APPARATUS FOR WAKING UP SMART DEVICE, SMART DEVICE AND MEDIUM

CROSS REFERENCE TO RELATED APPLICATION

This application is based upon and claims priority to Chinese Patent Application Serial No. 202010589348.4, filed with the State Intellectual Property Office of P. R. China on Jun. 24, 2020, the entire contents of which are incorporated herein by reference.

FIELD

The present disclosure relates to the field of smart device technology, and more particularly, to a method and an apparatus for waking up a smart device, a smart device and a medium.

BACKGROUND

With the technology advancement, the wake up technology becomes more and more widely used. As situations where there is a need to wake up the system increase, in order to enable a variety of systems to be awakened in appropriate scenarios, the wake up process must be accurate and a low power consumption state should be maintained. Therefore, higher requirements are proposed for the wake up technology. The wake up technology adapted to the wake up scene can keep a smart device in a standby state most of the time and awaken the smart device when needed, thereby saving the power consumption of the smart device, and enhancing the human-machine interaction experience at the same time.

In the related art, different wake up technologies are applied to different wake up scenarios. For example, for the sound-activated lights in the corridor, the scheme for waking up the sound-activated lights is simple and has low power consumption, but it is easy to cause false waking up, and it is difficult to control the ratio of waking up. For another example, the complex artificial intelligence voice wake up technology, such as the wake up process of the mobile phone assistant, has high recognition complexity. In the test phase, a complex training process is required, and the amount of computation used during the voice recognition process of the wake up process is extensive, which increases the power consumption of the mobile phone.

SUMMARY

In order to overcome the problems in the related art, the present disclosure provides a method and an apparatus for waking up a smart device, a smart device, and a medium.

According to the first aspect of the embodiments of the present disclosure, there is provided a method for waking up a smart device, which is applicable to a receiving end smart device, and the method includes: receiving sound information; determining whether the sound information includes a multi-frequency tone; when the sound information includes the multi-frequency tone, waking up a preset function of the smart device based on the multi-frequency tone.

According to a second aspect of the embodiments of the present disclosure, an apparatus for waking up a smart device is provided, which is applicable to a receiving end smart device and includes: a sound receiving module, configured to receive sound information; a processing module, configured to determine whether the sound information includes a multi-frequency tone; the processing module is further configured to, when the sound information includes the multi-frequency tone, wake up a preset function of the smart device.

According to a third aspect of the embodiments of the present disclosure, a smart device is provided and includes: a processor; memory configured to store instructions executable by the processor. The processor is configured to execute the method for waking up a smart device.

According to a fourth aspect of the embodiments of the present disclosure, a non-transitory computer-readable storage medium is provided. Computer instructions are stored thereon, executed by a processor of a smart device, to cause the processor to perform the method for waking up a smart device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
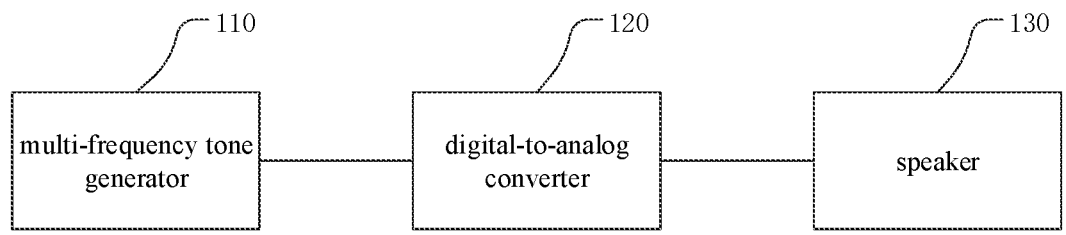
FIG. 1 is a block diagram of a signal transmitting end based on an embodiment of present disclosure.

Reference will now be made in detail to exemplary embodiments, which are illustrated in the accompanying drawings. The following description refers to the accompanying drawings in which the same reference numbers in different drawings represent the same or similar elements unless otherwise represented. The implementations set forth in the following description of exemplary embodiments do not represent all implementations consistent with the disclosure. Instead, they are merely examples of devices and methods consistent with aspects of the disclosure as recited in the appended claims.

With the technology advancement, the wake up technology becomes more and more widely used. As the application scenes that need to wake up systems become more and more, in order to enable a variety of systems to be awakened in appropriate scenarios, the wake up process must be accurate and a low power consumption state should be maintained, higher requirements are proposed for the wake up technology. The wake up technology adapted to the wake up scene can keep a smart device in a standby state most of the time and be awakened when needed, thereby saving the power consumption of the smart device, and enhancing the human-machine interaction experience at the same time.

In the related art, different wake up technologies are applied to different wake up scenarios. For example, for the sound-activated lights in the corridor, the scheme for waking up the sound-activated lights is simple and has low power consumption, but it is easy to cause false waking up, and it is difficult to control the ratio of waking up. For another example, the complex artificial intelligence voice wake up technology, such as the wake up process of the mobile phone assistant, has high recognition complexity. In the test phase, a complex training process is required, and computation amount during the voice recognition process of the wake up process is extensive, which increases the power consumption of the mobile phone.

In the related art, there are methods for waking up the system using radio frequency technology. For example, in the fields of intelligent transportation, warehousing and logistics, the radio frequency identification system includes a radio frequency wake up circuit transmitter and a radio frequency wake up circuit receiver. The working frequency thereof is a public frequency band of 915 MHz, and the effective wake up working range is 20 m. After the active electronic tag enters the working range, the processor of the active RFID electronic tag is awakened. After the processor and the active FRID reader complete the data processing, it enters the dormant state again until it is awakened next time. However, the cost of hardware devices such as radio frequency devices and radio frequency tags is relatively high, which is not suitable for use in daily life, and the application direction is mostly dedicated markets.

The present disclosure proposes a method for waking up a smart device. When the device receives sound information, it determines whether wake up information is received based on whether the sound information includes a multi-frequency tone, and then wakes up a preset function or maintains the current state. Since the determination is made based on the frequency domain features in the sound information, compared with a voice wake up method in the prior art and a wake up method based solely on the sound intensity, the wake up method in the present disclosure can ensure the accuracy of wake up while still reducing the complexity of the sound information processing and reducing the energy consumption of the smart device.

The smart device may be, for example, a mobile phone, a tablet computer, a smart speaker, a smart home appliance, and other devices used as a sound information receiving terminal. Moreover, the wake up method in the present disclosure is not limited to the wake up process of the smart device in the standby state, and can also be applied to the wake up of the preset function of the smart device. For example, an ultrasound module of the mobile phone is awakened, so that the ultrasound module of the mobile phone starts to encode. For another example, when a temperature and humidity detection device detects that the temperature is lower than a preset temperature, it wakes up an air conditioner to start temperature adjustment; when it detects that the humidity is lower than a preset temperature, it wakes up a humidifier to start humidity adjustment.

The method for waking up the smart device in the present disclosure is applied to the smart device at the receiving end that receives the wake up information. Sample wake up information is pre-stored in the smart device. When the smart device receives the sound information, it determines whether the sound information includes the sample wake up information based on the pre-stored sample wake up information. If the sound information includes the sample wake up information, the preset function of the smart device is awakened. If the sound information does not include the sample wake up information, the preset function of the smart device is not awakened.

In order to be able to wake up the smart device, another device is required to send the sample wake up information, that is, the sound information transmitter. In one example, when the temperature and humidity detection device detects that the temperature is lower than the set temperature, it sends a sound message containing the sample wake up information to wake up the air conditioner to start temperature adjustment. In this example, the temperature and humidity detection device is the sound information transmitting end device, and the air conditioner is the sound information receiving end device.

In another example, when the temperature and humidity detection device detects that the humidity is lower than the preset temperature, it sends a sound message including the sample wake up information to wake up the humidifier to start humidity adjustment. In this case, the temperature and humidity detection device is used as the transmitting end device of sample wake up information, and the humidifier is used as the receiving end device of sample wake up information.

Since the wake up information of the awakened smart device in the present disclosure uses a multi-frequency tone when it is awakened, if it is desired to wake up the smart device which is configured as the sound information receiver, the transmitting end device needs to emit sound information including the multi-frequency tone. Therefore, it is necessary to pre-write multi-frequency tone information into the device for transmitting the wake up information, that is, the smart device as the sound information transmitter has the function of emitting multi-frequency tone.

Because the device for transmitting the wake up information needs to emit a sound, the smart device can receive the wake up information. As shown in FIG. 1, the device needs to include a multi-frequency tone generator 110, a digital-to-analog converter 120, and a speaker 130. The digital-to-analog converter 120 is electrically connected to the multi-frequency tone generator 110 and the speaker 130, respectively. The multi-frequency tone generator 110 generates a digital signal based on the information written into the memory (not shown in the drawing) of the device in advance. The digital-to-analog converter 120 performs digital-to-analog conversion on the digital signal and converts the same into an analog signal, and the speaker 130 is used to broadcast the analog signal, so that the analog signal is received by the smart device. The multi-frequency tone generator 110, the digital-to-analog converter 120, the speaker 130 and the connection thereof are all technical content known to those skilled in the art, and will not be repeated herein.

Figure 2:
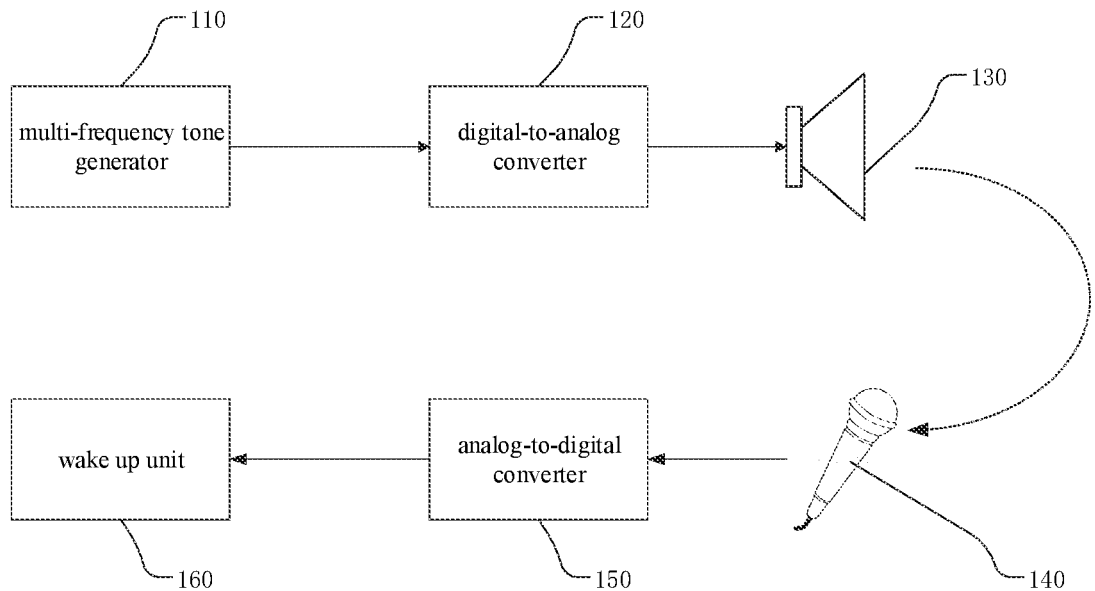
FIG. 2 is a block diagram showing a transmitting end device and a receiving end device based on an embodiment of the present disclosure.

In order to further explain the method in the present disclosure, the information transmission path between the transmitting end smart device and the receiving end smart device involved in the present disclosure, and the necessary hardware devices in the transmitting end smart device and the receiving end smart device are described. As shown in FIG. 2, the transmitting end device includes a multi-frequency tone generator 110, a digital-to-analog converter 120, and a speaker 130. The digital-to-analog converter 120 is electrically connected to the multi-frequency tone generator 110 and the speaker 130, respectively. The multi-frequency tone generator 110 generates a digital signal based on the information written into the memory (not shown in the drawing) of the device in advance. The digital-to-analog converter 120 performs digital-to-analog conversion on the digital signal and converts the same into an analog signal, and the speaker 130 is used to broadcast the analog signal, so that the analog signal is received by the smart device to be awakened.

The receiving end device includes an audio receiver 140, an analog-to-digital converter 150 and a wake up unit 160, and the analog-to-digital converter 150 is electrically connected to the audio receiver 140 and the wake up unit 160, respectively. The audio receiver 140 receives a sound signal in the external environment and sends the sound signal to the analog-to-digital converter 150. The analog-to-digital converter 150 converts the sound signal from the analog signal into a digital signal, and sends the converted data to the wake up unit 160. The wake up unit 160 determines whether to wake up the preset function of the receiving end smart device based on whether there is a multi-frequency tone in the received digital signal.

Before emitting the multi-frequency tone, the transmitting end device must generate the multi-frequency tone. The multi-frequency tone is formed by superposition of single-frequency tones of multiple frequency bands. In this disclosure, multiple single-frequency signals with specific frequencies are superimposed to form the multi-frequency tone. Both the sound synthesis method and the sound analysis method after receiving the multi-frequency tone are relatively simple and do not occupy a large amount of processing resources of the smart device. At the same time, in order to avoid auditory discomfort of users caused by only playing a multi-frequency tone, when synthesizing the multi-frequency tone, the sound source can be used as the basis, and multiple single-frequency tones of specific frequencies can be added to the sound source to enhance the user experience. The synthesis principle of multi-frequency tone will be described below.

When synthesizing the multi-frequency tone, a sampling interval needs to be considered. The sampling interval determines a frequency difference between multiple single-frequency tones selected for synthesizing the multi-frequency tone. It should be an integer times of the sampling interval.

In an example, a frequency range represented by the sampling interval is $$\Delta f = \frac{F_s}{b},$$

where Fs is a sampling rate, and b is the number of Fourier transform points. For example, if the sampling rate Fs is 16000 Hz and the number of Fourier transform points is 256, the frequency range represented by the sampling interval is $$\Delta f = \frac{16000}{256} = 64.5$$

Hz.

In order to ensure that the synthesized multi-frequency tone correspond to as many frequency points after the Fourier transform as possible after the synthesized multi-frequency tone is received and recognized by the smart device. When selecting the frequency of the single-frequency tone used to synthesize the multi-frequency tone, times of 64.5 Hz may be selected, for example, 64.5 Hz, 129 Hz, 193.5 Hz. In this example, several single-frequency tones can be directly selected to synthesize the wake up information, and several single-frequency tones are all integer times of 64.5 Hz.

Figure 3:
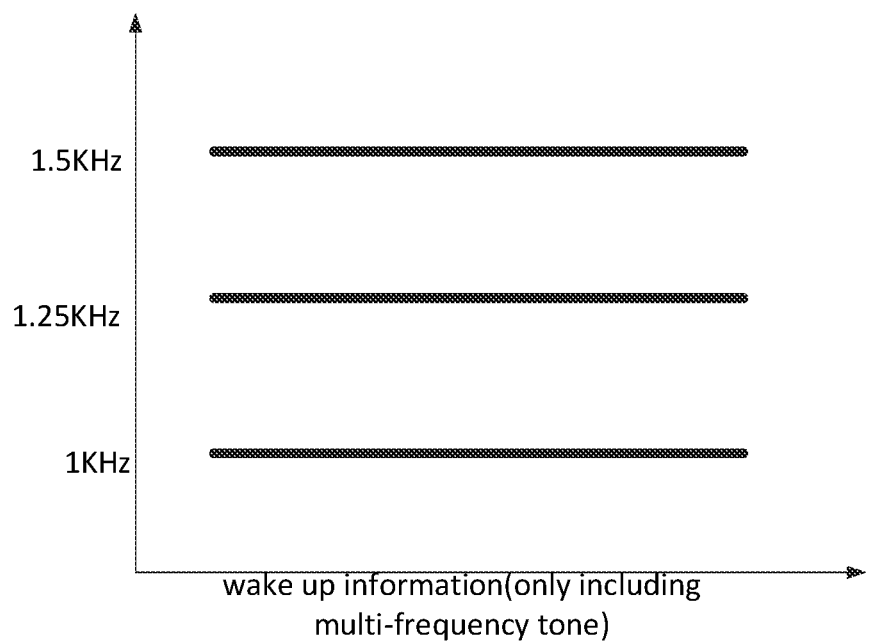
FIG. 3 is a schematic diagram showing a frequency spectrum of wake up information including a multi-frequency tone based on an embodiment of the present disclosure.

In addition to the above-mentioned multi-frequency tone using 64.5 Hz as the base, the multi-frequency tone using 0.25 KHz as the base may be selected. FIG. 3 shows the frequency distribution when the multi-frequency tone is formed by single-frequency tone of 1 KHz, 1.25 KHz, and 1.5 KHz.

Figure 4:
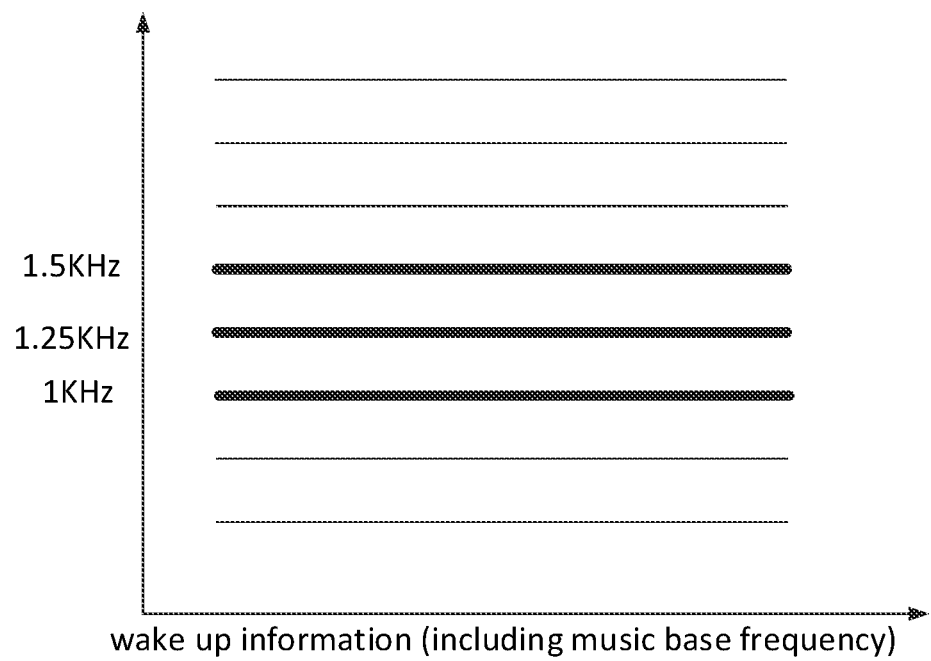
FIG. 4 is a schematic diagram showing a frequency spectrum including a multi-frequency tone and music base frequency based on an embodiment of the present disclosure.

In another example, music is used as the base frequency, and a single-frequency tone with a specific frequency structure is added to the base frequency to generate wake up information. Since the wake up information in this example uses music as the base frequency, the multi-frequency tone is added to the pleasing music, which improves the user's hearing experience. In this example, as shown in FIG. 4, several single-frequency tones are selected to synthesize the multi-frequency tone, and the multi-frequency tone is synthesized into the base frequency. The frequencies of the multiple single-frequency tone are, for example, 1 KHz, 1.25 KHz, 1.5 KHz . . . , the average value is an integer times of 0.25 KHz. Then the wake up information can be expressed as:

$$y(t)=A\sin(2\pi\times 1 kt)+B\sin(2\pi\times 1.25 kt)+C\sin(2\pi\times 1.5 kt)+D\sin(2\pi\times\omega t)+\ldots.$$

Among them, y(t) is the wake up information; t is a duration vector; A, B, C, and D are signal amplitudes; and ω is an angular frequency. The selection of ω can be set based on the effect of the music to be added. In this example, the base frequency of the music can be 250 Hz or an integer multiple of 250 Hz, so that after the smart device receives the sound information, the smart device determines the wake up information in the sound information.

Here, it should be noted that in this example, in order to set pleasing music, it is also possible to continue to superimpose the single-frequency tone formed in accordance with the above rules. In addition, the numerical values shown in this example are used for illustration only, and not as a limitation on the technical content of the present disclosure.

In order to describe the method for waking up the smart device in the present disclosure, firstly, the physical device related to the smart device is described. At present, most smart devices, such as smart speakers and smart phones, are set to support voice wake up function. The user speaks a specific sentence to wake up the smart device, which is convenient for daily use. However, the sentences used in the voice wake up process are complex, and the smart device needs to perform complex calculations when recognizing voice information. The smart device has more power consumption due to the large amount of calculation. For a smart device that supports the voice wake up function, sound wave collectors such as microphones are provided. In order to realize the voice wake up function, the microphone is kept in a normally open state to collect the sound wave. At the same time, this type of smart device also has a sound wave signal processing device to perform preprocessing or time domain and frequency domain transformation after receiving the sound information.

The method for waking up the smart device in the present disclosure can be applied to the above-mentioned smart device with voice wake up function. The smart device can have the voice wake up function and the multi-frequency tone wake up function in the present disclosure at the same time without adding other hardware devices and without additional power consumption, the wake up method in the present disclosure can be executed, which reduces the hardware cost required to implement the method in the present disclosure, and is more convenient for promotion.

For the receiving end smart device that has both the voice wake up function and the multi-frequency wake up function in the present disclosure, some functions of the smart device that need to interact with the user can be awakened using the voice wake up method, for example, search function, music playback function, etc., the voice wake up function can be used to wake up these functions.

For some functions on the smart device that can be performed without interacting with the user, the multi-frequency tone wake up method in the present disclosure can be used to wake up these functions, for example, the ultrasound function of mobile phones, the interconnection between smart home appliances, etc. so as to reduce the occupation of processing resources of the smart device, improve wake up efficiency and reduce the energy consumption of the smart device.

In the present disclosure, the voice wake up function and the multi-frequency tone wake up function are simultaneously run on the smart device, which can not only enhance the interaction effect between the user and the smart device, but also reduce the use of the voice wake up function to a certain extent, thereby reducing the energy consumption of the smart device.

Figure 5:
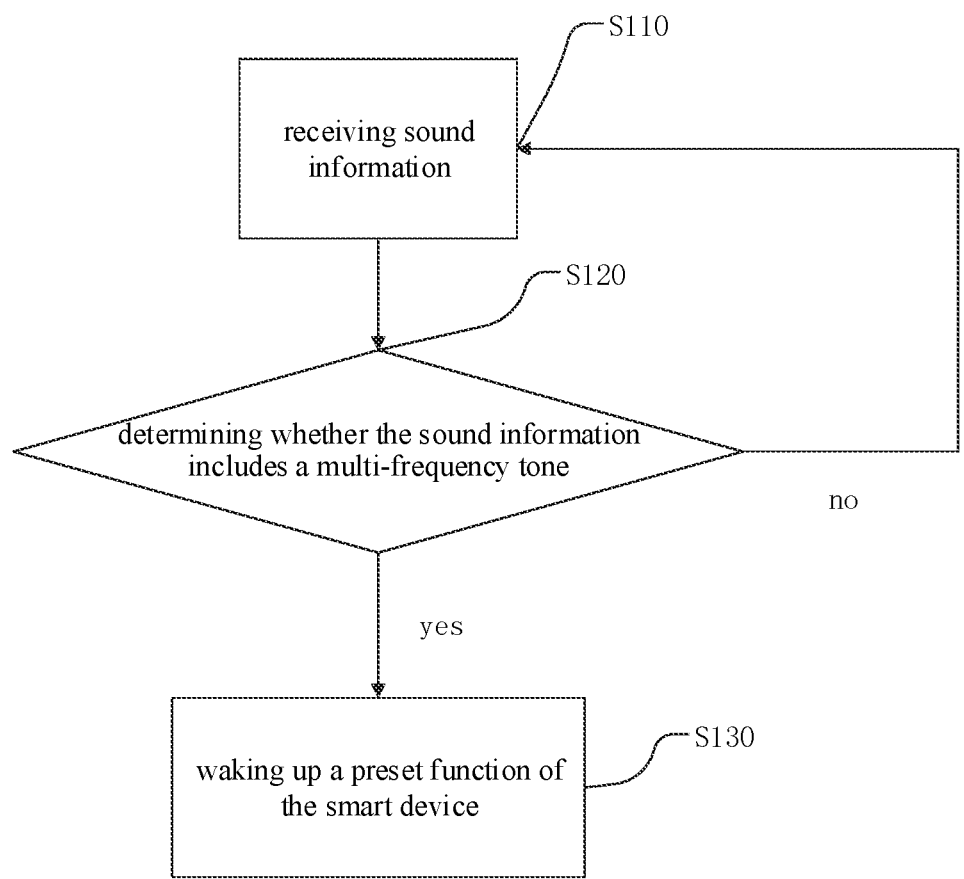
FIG. 5 is a flowchart showing a wake up method based on an embodiment of the present disclosure.

Based on an exemplary embodiment, as shown in FIG. 5, the method for waking up the smart device is executed by the smart device and includes the following steps.

S110, sound information is received.

In this step, the receiving of the sound information can be performed by a sound receiving module on the smart device, and the sound receiving module can be, for example, a microphone provided on the smart device.

S120, it is determined whether the sound information includes a multi-frequency tone, and if yes, step S130 is executed.

If no, the process returns to step S110.

In this step, if the smart device used as the receiving end detects the multi-frequency tone in the received sound information, it means that the received sound information includes the wake up information, then the smart device needs to be awakened based on the preset function.

If the smart device used as the receiving end does not detect the multi-frequency tone in the received sound information, it means that the sound information is not the multi-frequency tone used as wake up information from the smart device used as the transmitting end, the currently received sound information is ignored and the sound information in the external environment is continuously received.

Among them, the smart device used as the receiving end can acquire the sound information in its surrounding environment at every preset time interval, for example, receive the sound information in its surrounding environment every 20 ms. The aforementioned preset time interval can be set based on actual conditions, and there is no substantial limitation on the content of this disclosure.

S130, a preset function of the smart device is wakened up.

The preset function in this embodiment may be, for example, a standby state wake up function of a smart device used as a receiving end. The smart device is in the standby state until it receives the multi-frequency tone. When the smart device receives the multi-frequency tone in the sound information, the standby state is awakened, and the smart device is converted from the standby state to an operating state.

When the smart device in this embodiment is an air conditioner, the preset function may be the cooling or heating function of the air conditioner. When the air conditioner does not receive multi-frequency tone, the air conditioner is always in a standby state. When the air conditioner receives the multi-frequency tone in the sound information in the surrounding environment, the air conditioner changes from a standby state to a cooling state or a heating state.

In the wake up method in the present disclosure, it is determined whether the sound information received by the smart device includes the multi-frequency tone, so as to determine whether to wake up the preset function of the smart device. Frequency domain features are used as the determination basis in the present disclosure, thereby ensuring the accuracy of wake up, reducing the complexity of the sound information processing process and reducing the energy consumption of the smart device.

Figure 6:
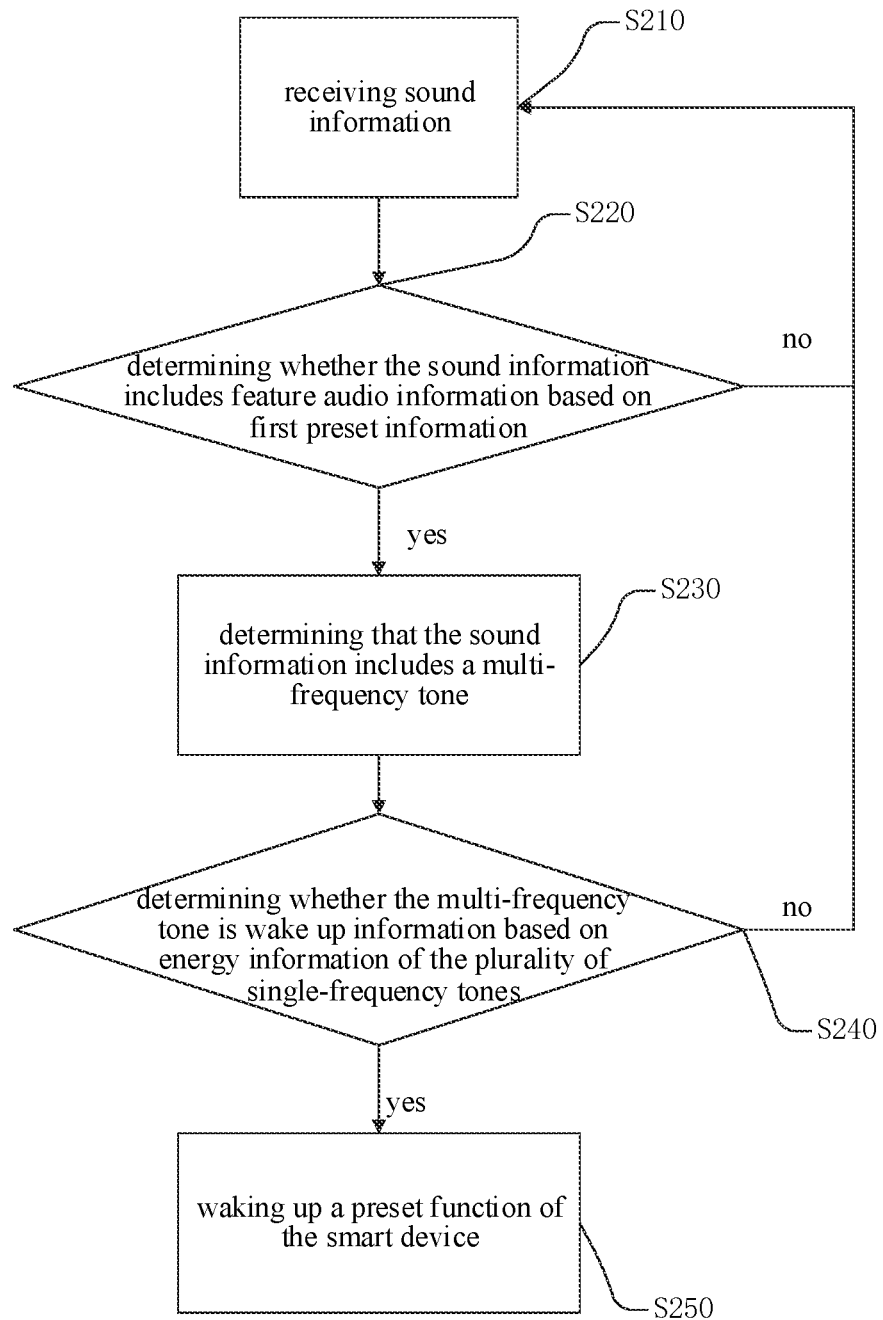
FIG. 6 is a flowchart showing a wake up method based on an exe an embodiment of the present disclosure.

Based on an exemplary embodiment, as shown in FIG. 6, the method for waking up a smart device in this embodiment is applied to a smart device used as a receiving end. The smart device in this embodiment implements the following steps.

S210, sound information is received.

The implementation of this step is the same as the implementation of step S110 in the foregoing embodiment, and will not be repeated herein.

S220, it is determined whether the sound information includes feature audio information based on first preset information, so as to determine whether the sound information includes a multi-frequency tone.

If yes, the process proceeds to step S230; if no, the process returns back to step S210.

In this step, the first preset information may be pre-stored in the memory of the smart device. After the sound receiving module receives the sound information, the processing module of the smart device obtains the first preset information from the memory to determine whether the sound information includes the wake up information. The first preset information includes a plurality of reference single-frequency tone features, and the reference single-frequency tone feature may be, for example, the frequency feature of the single-frequency tone.

After the sound information is received, it is determined whether the sound information includes feature audio information, and the feature audio information includes multiple single-frequency tones. The first preset information includes multiple reference single-frequency tone features, if the sound information includes multiple single-frequency tones, and the multiple single-frequency tones correspond to the multiple reference single-frequency tone features, it indicates that the sound information includes feature audio information. If the sound information does not include multiple single-frequency tones, or if the single-frequency tones included in the sound information do not correspond to multiple reference single-frequency tones, it means that the sound information does not include feature audio information.

If the sound information does not include feature audio information, it means that the sound information received by the smart device is not wake up information, and the smart device does not wake up the preset function and maintain the current state. If the sound information includes feature audio information, it means that the sound information may be the wake up information, but it is not necessarily the wake up information, and further determination is needed (it will be introduced in detailed later).

S230, it is determined that the sound information includes the multi-frequency tone.

In this step, if the currently received sound information includes the multi-frequency tone, it means that the received sound information is used to wake up the preset function of the smart device.

S240, it is determined whether the multi-frequency tone is the wake up information based on energy information of the plurality of single-frequency tones.

If yes, the process proceeds to step S250; if no, the process returns back to step S210.

The feature audio information in this embodiment is essentially a multi-frequency tone, and the multi-frequency tone is synthesized from multiple single-frequency tones. When determining whether the multi-frequency tone included in the sound information are wake up information, the energy information of the multiple single-frequency tone is used as a criterion for determination. For example, the energy information of each single-frequency tone can be considered separately to determine whether the multi-frequency tone is the wake up information; or the sum of the energy information of multiple single-frequency tones can be comprehensively considered to determine whether the feature audio information is the wake up information.

S250, a preset function of the smart device is wakened up.

After it is determined in step S240 that the multi-frequency tone is the wake up information, it means that the sound information is received to wake up the preset function of the smart device, and then the preset function of the smart device is awakened. For example, the ultrasound coding function of the mobile phone is awakened, or the humidification function of the humidifier is awakened.

Figure 7:
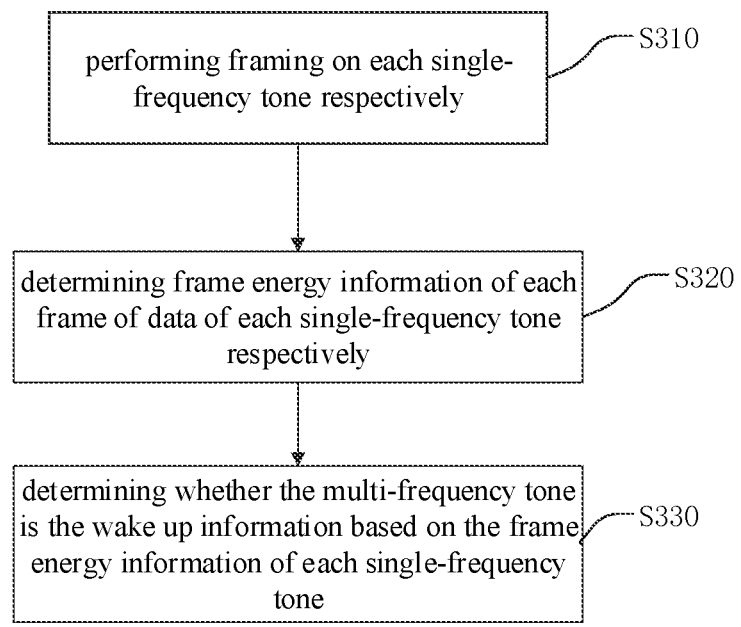
FIG. 7 is a flowchart showing a wake up method based on an embodiment of the present disclosure.

Based on an exemplary embodiment, as shown in FIG. 7, the method for waking up the smart device in this embodiment is a further limitation of step S240 in the above embodiment, and includes the following steps.

S310, framing is performed on each single-frequency tone respectively.

In this step, the processing module of the smart device performs framing on each single-frequency tone. In order to obtain a better framing effect and facilitate frequency domain analysis of the single-frequency tone, a framing and windowing process is implemented on each single-frequency tone.

When performing the framing and windowing process, $x_{(n)}$ is divided based on a frame length L to obtain frames of data, $x_1, x_2 \ldots x_k$, where L is generally an integer power of 2, for example, 128, 256; k is the serial number of the frame.

Then, the windowing process is performed on each frame of data, $x_{wi}$=window($x_i$), i=1, 2 . . . k, and the frames of data $x_{w1}, x_{w2} \ldots x_{wk}$ after the windowing process are obtained, where window represents a window function.

S320, frame energy information of each frame of data of each single-frequency tone is determined respectively.

In this step, when determining the frame energy information of each frame of data, it specifically includes: performing the frequency domain transformation on each frame of data of each single-frequency tone, and determining the frequency domain information of each frame of data of each single-frequency tone.

After the framing process is implemented on the single-frequency tone, for each single-frequency tone, Fourier transform is performed on each frame of data after windowing, and the frequency domain transformation is completed for each frame of data of each single-frequency tone, so as to determine the frequency domain information X1, X2 . . . Xi of each frame of single-frequency tone data. Among them, Xk=FT ($x_{wi}$), i=1, 2 . . . k.

After Fourier transform is performed on each single-frequency tone, the above-mentioned set of frequency domain information including each frame will be obtained, that is, a plurality of sets of frequency domain information will be obtained, and the number of the sets is the same as the number of single-frequency tones.

Then, the frequency point corresponding to each single-frequency tone is determined respectively based on the frequency domain information of each frame of data of each single-frequency tone.

In the above introduction of multi-frequency tone synthesis, the number of Fourier transform points was mentioned. The number of Fourier transform points is a parameter of Fourier transform. Those skilled in the art know how to use Fourier transform to realize frequency domain transform. It will not be repeated herein. Assuming that the number of Fourier transform points is M, for each single-frequency tone, the frequency domain information Xi of each frame of data included in the single-frequency tone can be decomposed into M corresponding frequency points.

In an example, assuming that the frequency of the single-frequency tone f=1000, the number of Fourier transform points M=128, and FS=16000, then based on $$b = \text{round}\left(\frac{f*M}{FS}\right),$$

it is determined that b=round (1000*128/16000)=8.

Among them, b represents which one of the M corresponding frequency points of the frequency domain information Xi. When b is 8, it represents that the 8th point among the M frequency points is the frequency point corresponding to the single-frequency tone.

Then, the frequency point energy information of the frequency point of each single-frequency tone is determined respectively.

In this step, in an example, assuming that the value of Xi(8) is 0.025+0.012i, then based on the formula:

$$p = \text{mod}\{X_i(b)\},$$

it can be determined that P=mod(0.025+0.012i)=0.0277.

The power of the corresponding frequency point of each frame of data of each single-frequency tone after Fourier transform, that is, the energy information is calculated, so as to determine whether the feature audio information is the wake up information based on the frame energy information of the single-frequency tone in the subsequent steps.

Then, the frequency band energy information of the frequency band where the frequency point of each single-frequency tone is located is determined based on the point energy information of the frequency point of each single-frequency tone.

In this step, after the point energy information of the frequency point of the single-frequency tone is determined in the above steps, it is necessary to further determine the frequency band energy information of the frequency band where the frequency point of the single-frequency tone is located, that is, the power of the frequency band corresponding to the frequency point.

It is determined whether the frame energy information is greater than the preset energy threshold based on the ratio of the point energy information of the frequency point to the frequency band energy information of the frequency band corresponding to the frequency point. That is, if the ratio of the point energy information of the frequency point to the frequency band energy information is greater than the preset energy threshold, it means that the determination has been performed on the frequency point, and the subsequent steps for determination can be continued.

When determining the frequency band energy information, the selection of the frequency band can be determined based on the actual situation. For example, if multi-frequency tone as a whole is used for framing and determination, the value range of the frequency band can be larger. For another example, if each single-frequency tone in the multi-frequency tone is used for framing and determination, the value range of the frequency band can be smaller to further improve the accuracy of the determination.

In one example, the multi-frequency tone as a whole is used for framing, and determination is performed for each frame of data. Assuming that K is the starting point of the frequency band, N is the end point of the frequency band, and $X_i(b)$ is the frequency point corresponding to the b-th point among the N–K+1 points. Assuming that the frequency range f where frequency point b is located is 1000 to 1500, and the points number of Fourier transform is M=128, it can be determined that the value range of b is 8-12 based on the formula used to determine frequency point b in the above steps.

The frequency band energy information in the frequency band can be determined based on the following formula:

$$P' = \sqrt{\frac{\sum_{b=K}^{N} x_i^2(b)}{N - K + 1}}$$

Then the frequency band energy information RMS in this example is:

$$P' = \sqrt{\frac{x_8^2 + x_9^2 + x_{10}^2 + x_{11}^2 + x_{12}^2}{5}}$$

In another example, the framing is performed on each single-frequency tone in the multi-frequency tone, and the determination is performed on each frame of data of each single-frequency tone. For each single-frequency tone, because its amplitude is different, the preset energy threshold corresponding to each single-frequency tone is also different. Assuming that the frequency point corresponding to a single-frequency tone in the multi-frequency tone is the 7th point among the M frequency points, when determining the frequency band corresponding to the frequency point, the 6th-8th points can be selected as the frequency band corresponding to the frequency point. Furthermore, the frequency band energy information is determined based on the above formula, and the relationship between the frame energy information of the single-frequency tone and the preset energy threshold is further determined.

S330, it is determined whether the multi-frequency tone is the wake up information based on the frame energy information of each single-frequency tone.

Since the frequency band energy information has been determined as the frame energy information in the above steps, it is determined whether the feature sound information is the wake up information based on the frame energy information.

Figure 8:
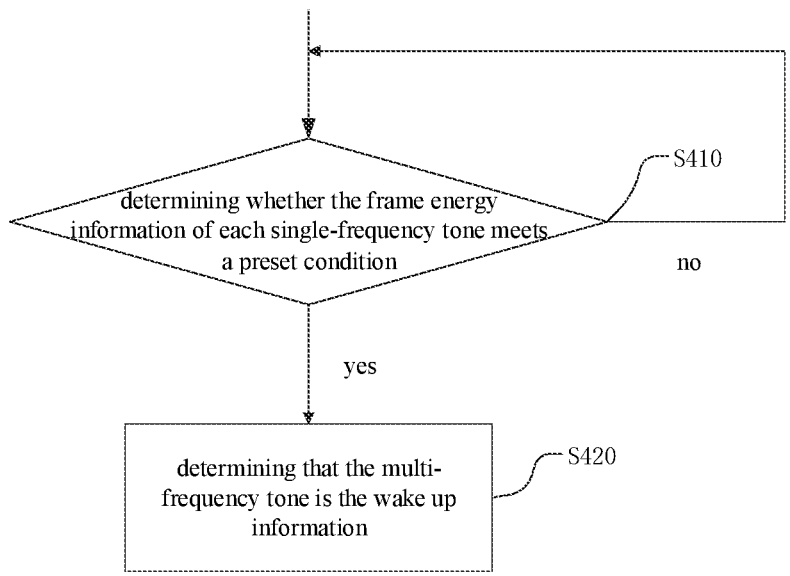
FIG. 8 is a flowchart showing a wake up method based on an embodiment of the present disclosure.

Based on an exemplary embodiment, as shown in FIG. 8, the method for waking up the smart device in this embodiment further defines step S330 in the above embodiment. The method in this embodiment further includes the following steps on the basis of the above embodiment.

S410, it is determined whether the frame energy information of each single-frequency tone meets a preset condition respectively.

If yes, the process proceeds to step S420; if no, the process returns back.

The preset condition is that there are consecutive N frames of signals for the single-frequency tone, and the frame energy information of each frame of data exceeds the preset energy threshold corresponding to the single-frequency tone.

In this step, in the specific determination process, it is necessary to determine whether the frame energy information of each single-frequency tone meets the preset condition. If the frame energy information of each single-frequency tone exceeds the preset energy threshold, and there are continuous N frames of signals where the frame energy information of each single-frequency tone exceeds the preset energy threshold, each single-frequency tone meets the preset condition, and it is considered that the received sound information includes the wake up information.

If the frame energy information of any one of the multiple single-frequency tones does not exceed the preset energy threshold, it means that it is not each single-frequency tone whose frame energy information meets the preset condition. At the same time, if the frame energy information of each single-frequency tone that meets the preset conditions is not continuous N frames, but at intervals, or N–1 frames are continuous, and the Nth frame is not continuous with the previous N–1 frames, then the multi-frequency tone does not meet the preset condition, and the received sound information does not include the wake up information.

S420, if the frame energy information of each single-frequency tone meets the preset condition, it is determined that the multi-frequency tone is the wake up information.

If each single-frequency tone meets the preset condition in the determination process of the above steps, it means that the multi-frequency tone included in the sound information is the wake up information, and the preset function of the smart device can be awakened.

If the sound information does not include the wake up information, the received sound information is automatically ignored, and the preset function is not awakened.

Figure 9:
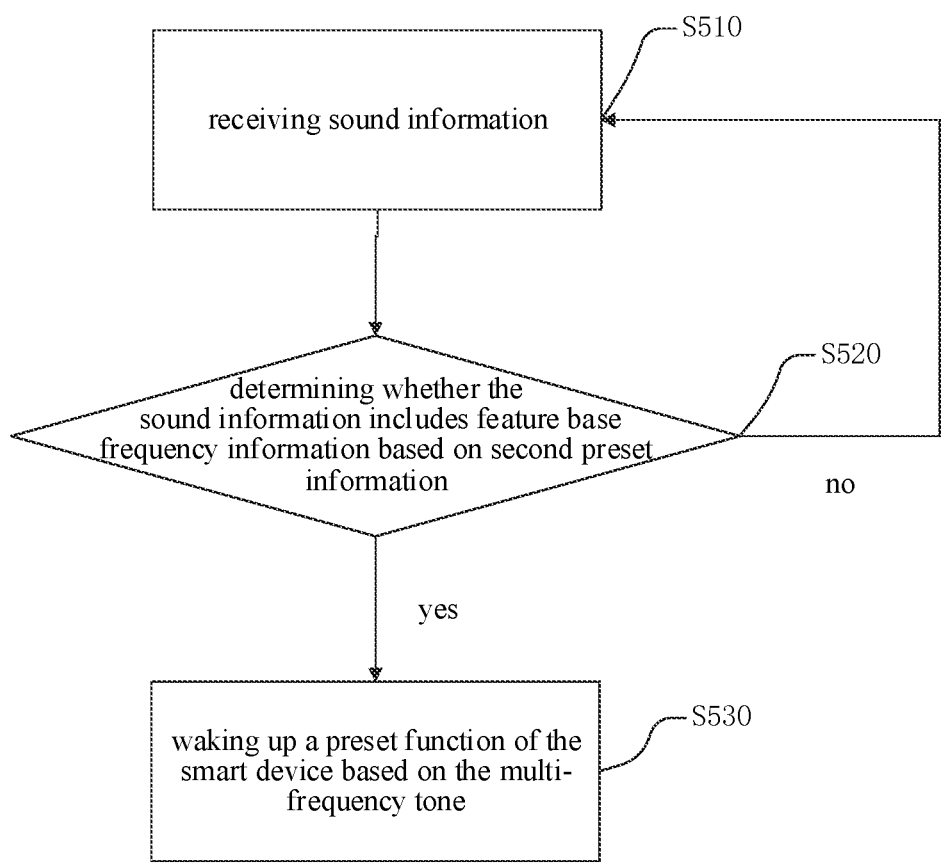
FIG. 9 is a flowchart showing a wake up method based on an embodiment of the present disclosure.

Based on an exemplary embodiment, the method in this embodiment is applied to a process of forming the wake up information by synthesizing multi-frequency tone synthesized from multiple single-frequency tones with a sound source, that is, signals sent by other devices to smart devices are music signals. As shown in FIG. 9, the wake up method in this embodiment includes the following steps in addition to the method in the foregoing embodiment.

S510, sound information is received.

S520, it is determined whether the sound information includes feature base frequency information based on second preset information.

If yes, the process proceeds to step S530; if no, the process returns back to step S510.

The second preset information includes a reference base frequency feature, and the feature base frequency information corresponds to the reference base frequency feature.

In this step, the second preset information can be pre-stored in the memory of the smart device. After the sound receiving module receives the sound information, the processing module of the smart device obtains the second preset information from the memory to determine whether the sound information includes the wake up information. The second preset information includes reference base frequency information, and the reference base frequency information may be, for example, music frequency features.

After the sound information is received, it is determined whether the sound information includes feature base frequency information. If the sound information includes feature base frequency information corresponding to the reference base frequency feature, it means that the sound information may include the wake up information, but further determination is needed. It can be determined whether the sound information including feature base frequency information includes the wake up information. If the sound information does not include feature base frequency information, it means that the sound information cannot be used as the wake up information, and the sound information is ignored.

S530, if the sound information includes feature base frequency information, a preset function of the smart device is wakened up based on the multi-frequency tone.

In the method in this embodiment, since the signal sent by other devices to the smart device is a music signal, it needs to determine the feature sound information shown in the other embodiments above, it further needs to determine whether the pitch of the base frequency in the received sound signal is consistent with the reference base frequency information in the second configuration information. If the sound information includes feature base frequency information, it means that the sound information may include the wake up information. It needs to further determine whether the multi-frequency tone included in the sound information is the wake up information based on the energy information of each single-frequency tone or the whole energy information of the multiple-frequency tone, to determine whether to wake up the preset function of the smart device.

Based on an exemplary embodiment, this embodiment is applied in the wake up process of the ultrasound system of the smart device, that is, when the preset function is the ultrasound system of the smart device, a duration for performing ultrasound encoding by the ultrasound system is determined based on the duration of the received feature audio information.

In one example, in the actual implementation process, the ultrasound system is controlled to start ultrasound encoding from the moment the feature audio information is received, and stop the ultrasound encoding from the moment the feature audio information is stopped, ultrasound encoding of the ultrasound system is synchronized based on the received wake up information. In order to avoid mutual interference between the multi-frequency tone as the wake up information and the ultrasound encoded digital signal, when the wake up information is set, the frequency band where the ultrasound encoded signal is located should be avoided.

In order to further explain the method for waking up the smart device in the present disclosure, an ultrasound system that receives sound information to wake up the smart device is used as an application scenario and combined with a system block diagram to illustrate the wake up method in the present disclosure.

Figure 10:
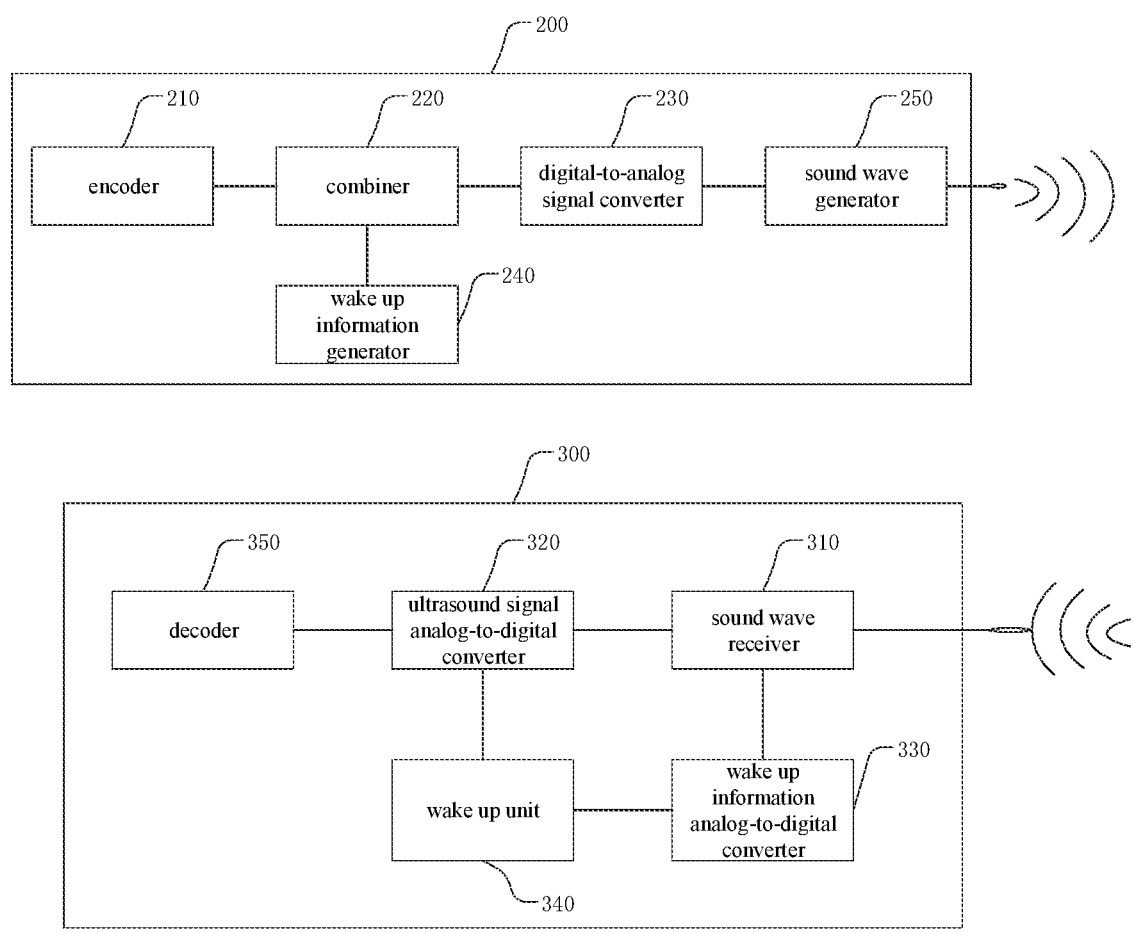
FIG. 10 is a block diagram showing a signal transmitting end and a signal receiving end based on an embodiment of the present disclosure.

As shown in FIG. 10, the wake up information transmitter 200 includes an encoder 210, a combiner 220, and a digital-to-analog signal converter 230 connected in sequence, and also includes a wake up information generator 240 electrically connected to the combiner 220, and a the sound wave generator 250 electrically connected to the digital-to-analog signal converter 230. The encoder 210 is configured to start encoding the ultrasound digital signal when receiving an instruction to send wake up information, and send the ultrasound encoded digital signal to the combiner 220 after the encoding is completed. At the same time, the wake up information generator 240 starts to generate the wake up information when receiving an instruction to send the wake up information, and sends the wake up information to the combiner 220. The combiner 220 combines the ultrasound encoded digital signal and the wake up information to generate the ultrasound encoded digital signal having the wake up information. The digital-to-analog signal converter 230 receives the ultrasound encoded digital signal having wake up information, converts the same into an analog signal, and sends the analog signal to the sound wave generator 250 for external broadcasting.

The smart device 300 includes a sound wave receiver 310, and an ultrasound signal analog-to-digital converter 320 and a wake up information analog-to-digital converter 330 that are electrically connected to the sound wave receiver 310, respectively. The smart device also includes a wake up unit 340, which is respectively connected to the ultrasound signal analog-to-digital converter 320 and the wake up information analog-to-digital converter 330. In addition, the smart device further includes a decoder 350, which is electrically connected to the ultrasound signal analog-to-digital converter 320.

After the sound wave receiver 310 receives the sound information, it sends the sound information to the ultrasound signal analog-to-digital converter 320 and the wake up information analog-to-digital converter 330, and the wake up information analog-to-digital converter 330 performs analog-to-digital conversion on the sound information. If the sound information includes wake up information, the wake up unit 340 sends a wake up instruction to the ultrasound signal analog-to-digital converter 320, the ultrasound signal analog-to-digital converter 320 is awakened, and the ultrasound signal analog-to-digital converter 320 performs analog-to-digital conversion on the ultrasound signal in the received sound information. The ultrasound signal which is a digital signal is sent to the decoder 350, and the information or instructions decoded by the decoder 350 are stored.

Figure 11:
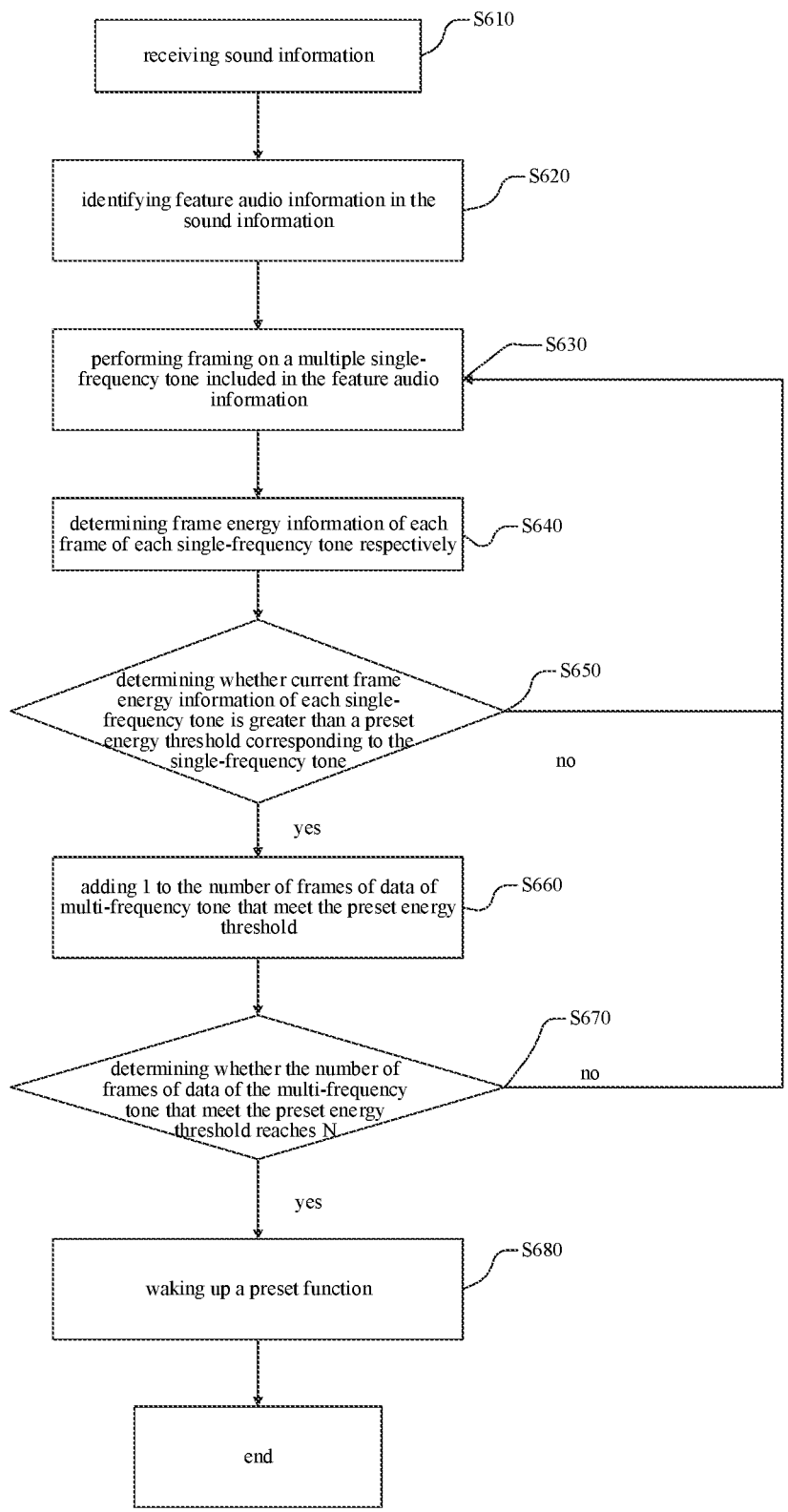
FIG. 11 is a flowchart showing a wake up method based on an embodiment of the present disclosure.

Based on an exemplary embodiment, as shown in FIG. 11, a specific implementation process of the method for waking up the smart device in the present disclosure is described in detail below. The wake up method in this embodiment includes the following steps.

S610, sound information is received.

S620, feature audio information is identified in the sound information.

S630, framing is performed on a multiple single-frequency tone included in the feature audio information.

S640, frame energy information of each frame of each single-frequency tone is determined respectively.

S650, it is determined whether current frame energy information of each single-frequency tone is greater than a preset energy threshold corresponding to the single-frequency tone.

If yes, the process proceeds to step S660, if no, the process returns back to step S630.

S660, 1 is added to the number of frames of data of multi-frequency tone that meet the preset energy threshold.

S670, it is determined whether the number of the frames of data of the multi-frequency tone that meet the preset energy threshold reaches N.

If yes, the process proceeds to step S680; if no, the process returns back to step S630.

S680, a preset function is wakened up.

Steps S650 to S670 are used to separately determining whether the frame energy information of each single-frequency tone meets the preset condition. The preset condition is that the single-frequency tone has consecutive N frames of signals, and the frame energy information of each frame of data exceeds the preset energy threshold corresponding to the single-frequency tone.

Here, it should be noted that, because the amplitude of each single-frequency tone used to synthesize a multi-frequency tone is different, the preset energy threshold corresponding to each single-frequency tone is also different. When determining whether each single-frequency tone in the multi-frequency tone meets the preset conditions, different preset energy thresholds should be used as the determination base to further improve the accuracy of the determination.

In this embodiment, after the sound information is received, when determining whether the sound information includes a multi-frequency tone, that is, whether it includes the wake up information, the energy information and duration of the multi-frequency tone are considered at the same time, which improves the accuracy of determining the wake up information in the sound information and avoid false triggering.

Of course, it can be understood that for some functions that are not too important to be awakened, it is not necessary to consider the two factors of energy information and duration at the same time, and only a single factor can be considered.

Figure 12:
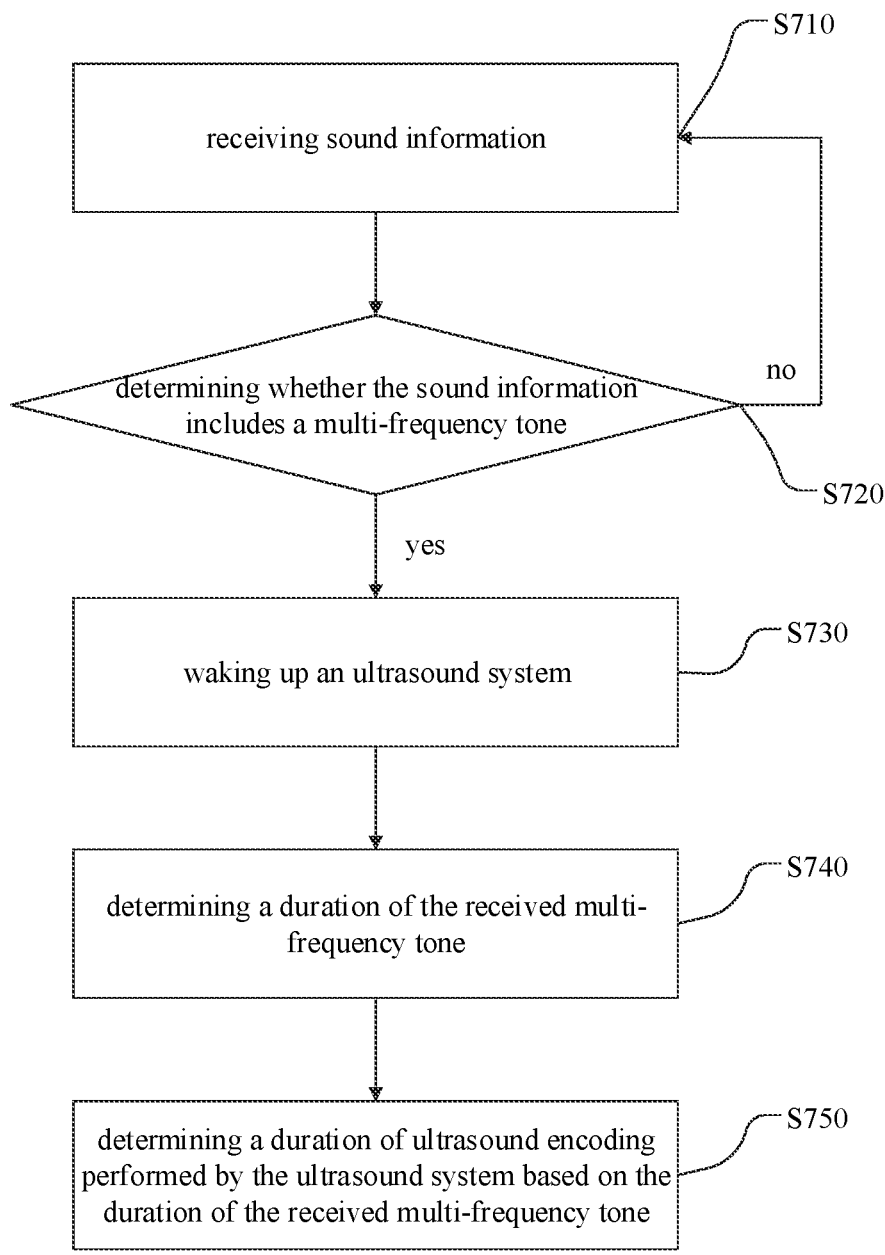
FIG. 12 is a flowchart showing a wake up method based on an embodiment of the present disclosure.

In an example, as shown in FIG. 12, the preset function of the smart device is a function of an ultrasound system of the smart device, that is, the ultrasound system of the smart device is awakened when multi-frequency tone is received. And in this example, the multi-frequency tone is a simple synthesis of multiple single-frequency tones, and does not include other music information. When waking up the preset function, only the duration of the multi-frequency tone in the sound information is considered. The methods in this example include the following steps.

S710, sound information is received.

S720, it is determined whether the sound information includes a multi-frequency tone.

If yes, the process proceeds to step S730; if no, the process returns back to step S710.

S730, the ultrasound system is wakened up.

S740, a duration of the received multi-frequency tone is determined.

S750, a duration of ultrasound encoding performed by the ultrasound system is determined based on the duration of the received multi-frequency tone.

Figure 13:
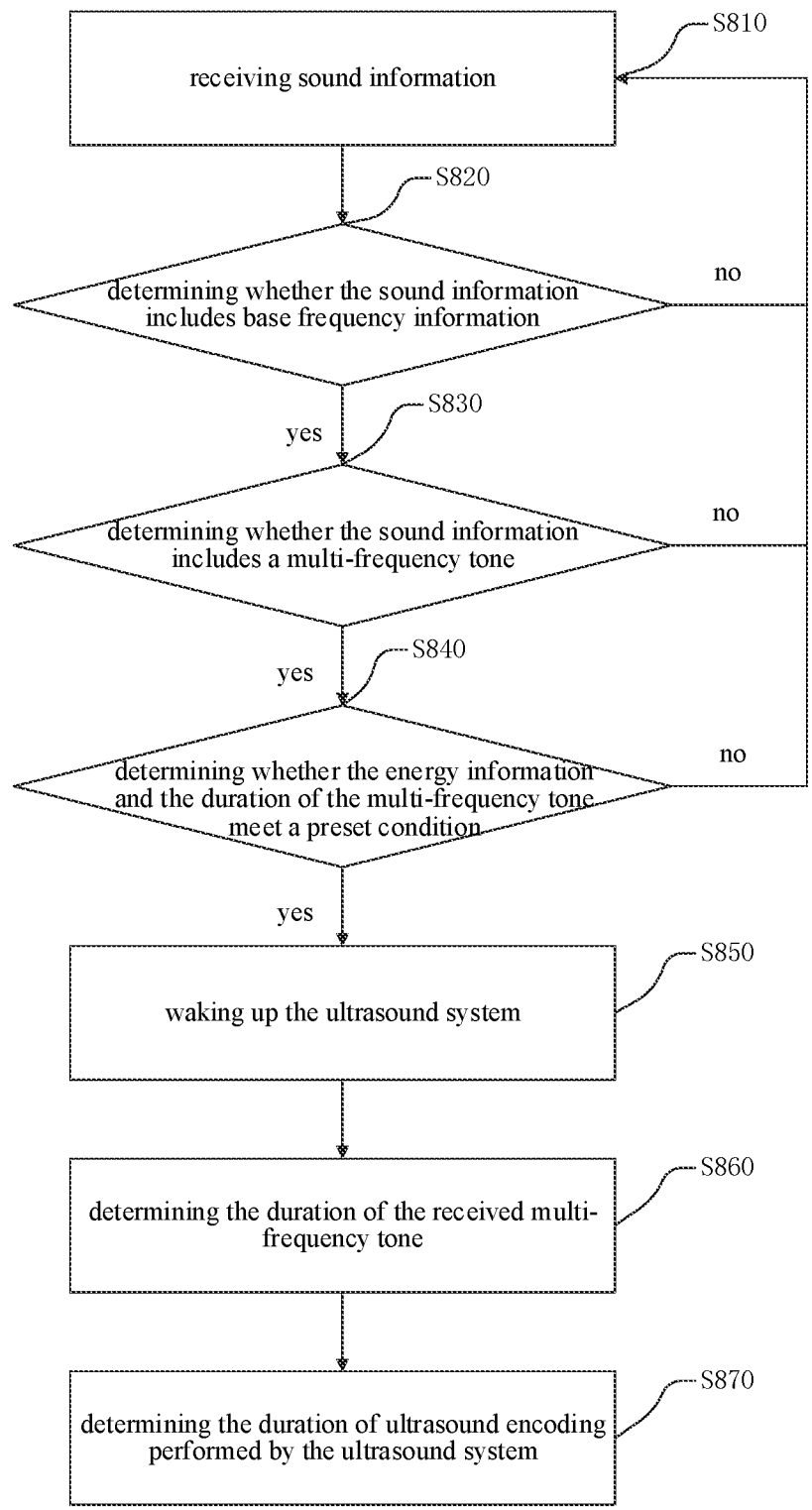
FIG. 13 is a flowchart showing a wake up method based on an embodiment of the present disclosure.

In another example, as shown in FIG. 13, the preset function of the smart device is still the function of the ultrasound system of the smart device. In this example, the audio as the wake up information includes both the multi-frequency tone and base frequency information, that is, music information. In this example, the duration and energy information of the multi-frequency tone are considered at the same time. The method in this example includes the following steps.

S810, sound information is received.

S820, it is determined whether the sound information includes base frequency information.

If yes, the process proceeds to step S830, if no, the process returns back to step S810.

S830, it is determined whether the sound information includes a multi-frequency tone.

If yes, the process proceeds to step S840, if no, the process returns back to step S810.

S840, it is determined whether energy information and a duration of the multi-frequency tone meet a preset condition.

If yes, the process proceeds to step S850, if no, the process returns back to step S810.

S850, the ultrasound system is wakened up.

S860, the duration of the received multi-frequency tone is determined.

S870, a duration of ultrasound encoding performed by the ultrasound system is determined.

Figure 14:
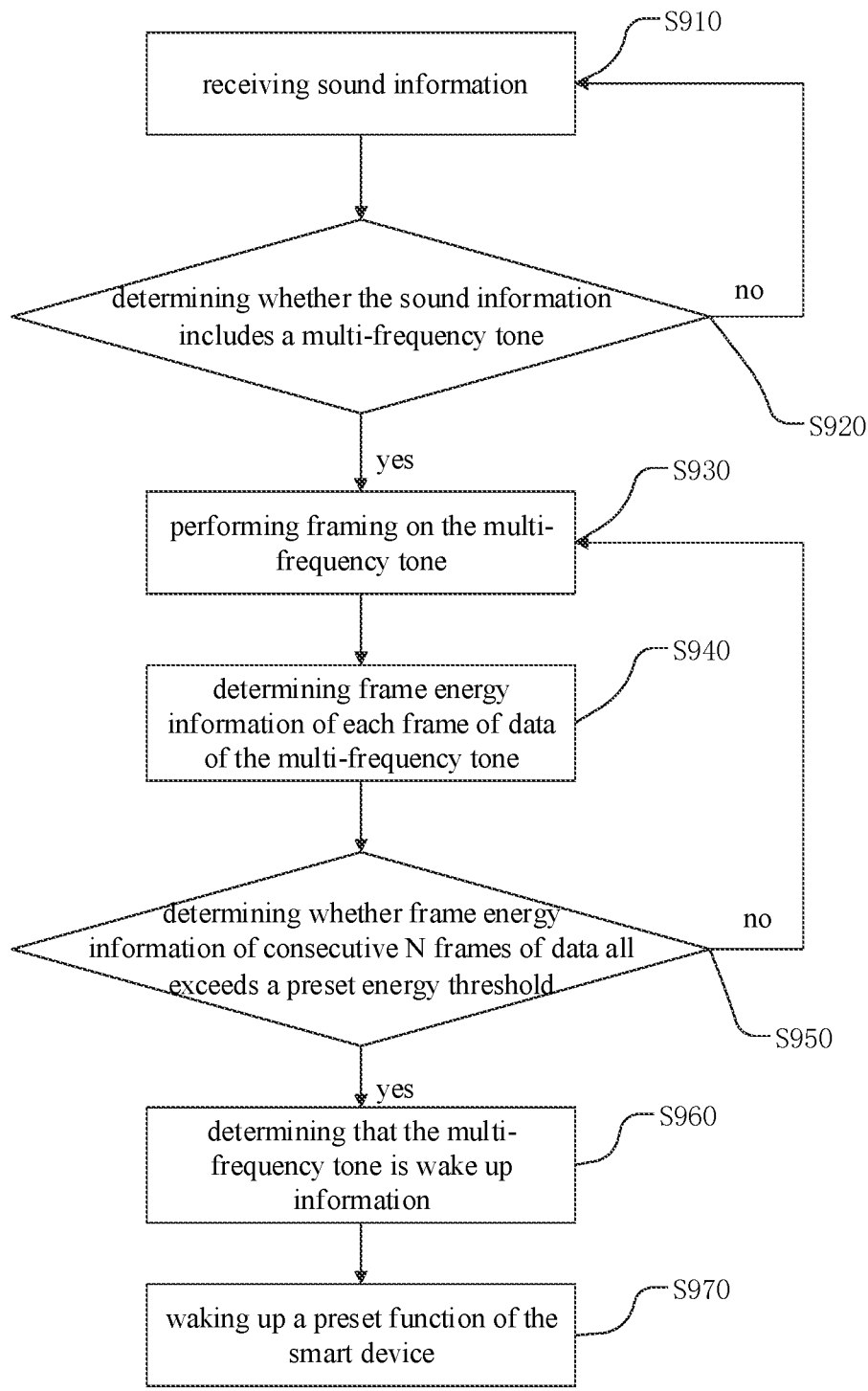
FIG. 14 is a flowchart showing a wake up method based on an embodiment of the present disclosure.

Based on an exemplary implementation, as shown in FIG. 14, the method for waking up the smart device in this embodiment can also be implemented using the smart system shown in FIG. 10. The wake up method in this embodiment is applied to the receiving end smart device. The method in this embodiment includes the following steps.

S910, sound information is received.

S920, it is determined whether the sound information includes a multi-frequency tone.

If yes, the process proceeds to step S930; if no, the process returns back to step S910.

S930, framing is performed on the multi-frequency tone.

S940, frame energy information of each frame of data of the multi-frequency tone is determined.

S950, it is determined whether frame energy information of consecutive N frames of data all exceeds a preset energy threshold.

If yes, the process proceeds to step S960; if no, the process returns back to step S930.

S960, it is determined that the multi-frequency tone is wake up information.

S970, a preset function of the smart device is wakened up.

In this embodiment, when determining whether the multi-frequency tone is the wake up information, the framing is performed on the multi-frequency tone as a whole, and it is determined whether frame energy information of consecutive N frames of data all exceeds the preset energy threshold based on the determination of each frame of data of the multi-frequency tone, that is, the duration and energy information of the multi-frequency tone are considered at the same time. If the continuous N frames of data of the multi-frequency tone all exceeds the preset energy threshold, the multi-frequency tone is the wake up information, then the preset function of the smart device is awakened.

In this embodiment, the framing is performed on the multi-frequency tone as a whole, the processing is simpler and more efficient, and the processing efficiency of the multi-frequency tone is improved.

The present disclosure also provides a device for waking up a smart device, and the device is used to implement the method for waking up a smart device described in the above embodiment.

Figure 15:
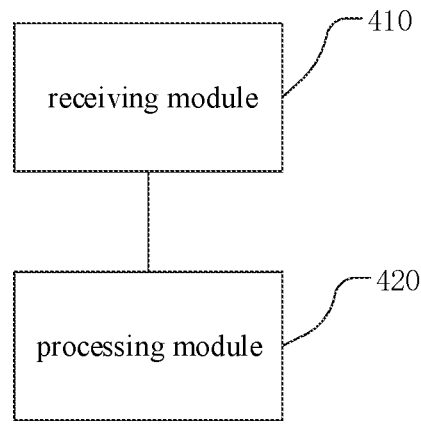
FIG. 15 is a block diagram showing a wake up device based on an embodiment of the present disclosure.

Based on an exemplary embodiment, as shown in FIG. 15, the device is applied to a smart device used as a receiving end. The device in this embodiment includes a sound receiving module 410 and a processing module 420 electrically connected to each other. The device in this embodiment is used to implement the method for waking up applied on the smart device at the receiving end.

Figure 16:
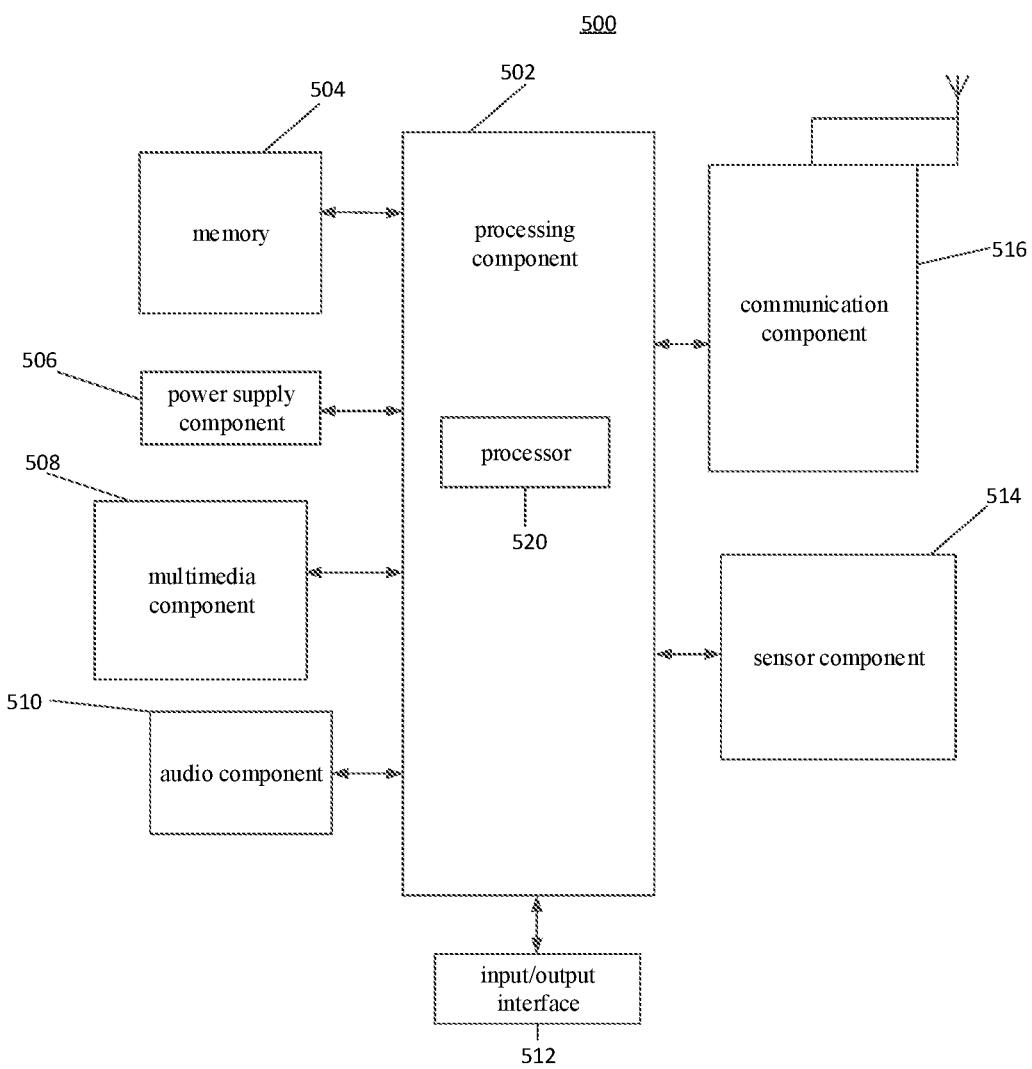
FIG. 16 is a block diagram showing a smart device based on an embodiment of the present disclosure.

FIG. 16 is a block diagram of a smart device. The present disclosure also provides a smart device including a processor; memory for storing executable instructions of the processor. The processor is configured to execute the above-mentioned method. The device 500 may be a mobile phone, a computer, a digital broadcasting terminal, a messaging device, a game console, a tablet device, a medical device, a fitness device, a personal digital assistant, etc. The smart device can also be a photosensitive element, such as a light sensor.

The device 500 may include one or more components: a processing component 502, a memory 504, a power component 506, a multimedia component 508, an audio component 510, an input/output (I/O) interface 512, a sensor component 514, and a communication component 516.

The processing component 502 generally controls the overall operations of the device 500, such as operations associated with display, telephone calls, data communications, camera operations, and recording operations. The processing component 502 may include one or more processors 520 to execute instructions to complete all or part of the steps of the foregoing method. In addition, the processing component 502 may include one or more modules to facilitate the interaction between the processing component 502 and other components. For example, the processing component 502 may include a multimedia module to facilitate the interaction between the multimedia component 508 and the processing component 502.

The memory 504 is configured to store various types of data to support operations in the device 500. Examples of these data include instructions for any application or method operating on the device 500, contact data, phone book data, messages, pictures, videos, and so on. The memory 504 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 506 provides power to various components of the device 500. The power component 506 may include a power management system, one or more power supplies, and other components associated with generating, managing, and distributing power for the device 500.

The multimedia component 508 includes a screen that provides an output interface between the device 500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 508 includes a front camera and/or a rear camera. When the device 500 is in an operation mode, such as a shooting mode or a video mode, the front camera and/or the rear camera can receive external multimedia data. Each front camera and rear camera can be a fixed optical lens system or an optical lens system having focal length and optical zoom capabilities.

The audio component 510 is configured to output and/or input audio signals. For example, the audio component 510 includes a microphone (MIC). When the device 500 is in an operating mode, such as a call mode, a recording mode, and a voice recognition mode, the microphone is configured to receive external audio signals. The received audio signals may be further stored in the memory 504 or transmitted via the communication component 516. In some embodiments, the audio component 510 further includes a speaker for outputting audio signals.

The I/O interface 512 provides an interface between the processing component 502 and a peripheral interface module. The above-mentioned peripheral interface module may be a keyboard, a click wheel, a button, and the like. These buttons may include but are not limited to: home button, volume button, start button, and lock button.

The sensor component 514 includes one or more sensors for providing the device 500 with various aspects of state assessment. For example, the sensor component 514 can detect the open/close state of the device 500 and the relative positioning of components, such as the display and keypad of the device 500. The sensor component 514 can also detect the position change of the device 500 or a component of the device 500, presence or absence of contact of the user to the device 500, the orientation or acceleration/deceleration of the device 500, and the temperature change of the device 500. The sensor component 514 may include a proximity sensor configured to detect the presence of nearby objects when there is no physical contact. The sensor component 514 may also include a light sensor, such as a CMOS or CCD image sensor, for use in imaging applications. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and other devices. The device 500 can access a wireless network based on a communication standard, such as Wi-Fi, 2G, or 3G, or a combination thereof. In an exemplary embodiment, the communication component 516 receives a broadcast signal or broadcast related information from an external broadcast management system via a broadcast channel. In an exemplary embodiment, the communication component 516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 500 may be implemented by one or more application specific integrated circuits (ASICs), digital signal processors (DSP), digital signal processing devices (DSPD), programmable logic devices (PLD), field programmable gate array (FPGA), controller, microcontroller, microprocessor, or other electronic components, used to perform the above methods.

Another exemplary embodiment of the present disclosure provides a non-transitory computer-readable storage medium, such as a memory 504 including instructions, which can be executed by the processor 520 of the device 500 to complete the foregoing method. For example, the computer-readable storage medium may be ROM, random access memory (RAM), CD-ROM, magnetic tape, floppy disk, optical data storage device, etc. When the instructions in the storage medium are executed by the processor of the smart device, the smart device can execute the above method.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for waking up a smart device, applicable to a receiving end smart device, the method comprising:
    receiving sound information;
    determining whether the sound information includes a multi-frequency tone, comprising: determining whether the sound information includes feature audio information based on first preset information; and determining that the sound information includes the multi-frequency tone when the sound information includes the feature audio information, wherein the feature audio information includes a plurality of single-frequency tones, the first preset information includes a plurality of reference single-frequency tone features, and the plurality of single-frequency tones correspond to the plurality of reference single-frequency tone features;
    determining whether the sound information includes feature base frequency information based on second preset information, wherein the second preset information includes a reference base frequency feature, and the feature base frequency information corresponds to the reference base frequency feature; and
    waking up a preset function of the smart device based on the multi-frequency tone when the sound information includes the feature base frequency information,
    wherein the waking up the preset function of the smart device based on the multi-frequency tone comprises:
    determining whether the multi-frequency tone is wake up information based on energy information of the plurality of single-frequency tones, and
    waking up the preset function of the smart device when the multi-frequency tone is the wake up information; and
    wherein the determining whether the multi-frequency tone is the wake up information based on the energy information of the plurality of single-frequency tones comprises:
    performing framing on each single-frequency tone,
    determining frame energy information of each frame of data of each single-frequency tone, and
    determining whether the multi-frequency tone is the wake up information based on the frame energy information of each single-frequency tone, wherein the frame energy information of the single-frequency tone is a ratio of point energy information of a frequency point of the single frequency tone to frequency band energy information of a frequency band corresponding to the frequency point.

2. The method according to claim 1, wherein the determining whether the multi-frequency tone is the wake up information based on the frame energy information of each single-frequency tone comprises:
    determining whether the frame energy information of each single-frequency tone meets a preset condition, wherein the preset condition is that there are consecutive N frames of signals for the single-frequency tone, and the frame energy information of each frame of data exceeds a preset energy threshold corresponding to the single-frequency tone; and
    determining that the multi-frequency tone is the wake up information when the frame energy information of each single-frequency tone meets the preset condition.

3. The method according to claim 1, wherein when the preset function is a function of an ultrasound system of the smart device, the method comprises:
    determining a duration of ultrasound encoding performed by the ultrasound system based on a duration of the multi-frequency tone.

4. The method according to claim 3, wherein the determining the duration of ultrasound encoding performed by the ultrasound system based on the duration of the multi-frequency tone comprises:
    controlling the ultrasound system to start ultrasound encoding from a moment when the multi-frequency tone is received; and
    controlling the ultrasound system to stop ultrasound encoding from a moment when the multi-frequency tone is stopped.

5. A smart device, comprising:
    a processor;
    memory configured to store instructions executable by the processor;
    wherein, the processor is configured to execute the method for waking up a smart device, comprising:
    receiving sound information;
    determining whether the sound information includes a multi-frequency tone, comprising:
    determining whether the sound information includes feature audio information based on first preset information; and determining that the sound information includes the multi-frequency tone when the sound information includes the feature audio information, wherein the feature audio information includes a plurality of single-frequency tones, the first preset information includes a plurality of reference single-frequency tone features, and the plurality of single-frequency tones correspond to the plurality of reference single-frequency tone features; and
    determining whether the sound information includes feature base frequency information based on second preset information, wherein the second preset information includes a reference base frequency feature, and the feature base frequency information corresponds to the reference base frequency feature; and waking up a preset function of the smart device based on the multi-frequency tone when the sound information includes the feature base frequency information, wherein the waking up the preset function of the smart device based on the multi-frequency tone comprises:

determining whether the multi-frequency tone is wake up information based on energy information of the plurality of single-frequency tones; and waking up the preset function of the smart device when the multi-frequency tone is the wake up information, wherein the determining whether the multi-frequency tone is the wake up information based on the energy information of the plurality of single-frequency tones comprises:

performing framing on each single-frequency tone;

determining frame energy information of each frame of data of each single-frequency tone; and determining whether the multi-frequency tone is the wake up information based on the frame energy information of each single-frequency tone, wherein the frame energy information of the single-frequency tone is a ratio of point energy information of a frequency point of the single frequency tone to frequency band energy information of a frequency band corresponding to the frequency point.

6. The smart device according to claim 5, wherein the determining whether the multi-frequency tone is the wake up information based on the frame energy information of each single-frequency tone comprises:

determining whether the frame energy information of each single-frequency tone meets a preset condition, wherein the preset condition is that there are consecutive N frames of signals for the single-frequency tone, and the frame energy information of each frame of data exceeds a preset energy threshold corresponding to the single-frequency tone; and determining that the multi-frequency tone is the wake up information when the frame energy information of each single-frequency tone meets the preset condition.

7. The smart device according to claim 5, wherein when the preset function is a function of an ultrasound system of the smart device, the processor is configured to perform an operation of:

determining a duration of ultrasound encoding performed by the ultrasound system based on a duration of the multi-frequency tone.

8. A non-transitory computer-readable storage medium having computer instructions stored thereon, executed by a processor of a smart device, to cause the processor to perform the method for waking up a smart device, comprising:

receiving sound information;

determining whether the sound information includes a multi-frequency tone, comprising:

determining whether the sound information includes feature audio information based on first preset information; and determining that the sound information includes the multi-frequency tone when the sound information includes the feature audio information, wherein the feature audio information includes a plurality of single-frequency tones, the first preset information includes a plurality of reference single-frequency tone features, and the plurality of single-frequency tones correspond to the plurality of reference single-frequency tone features; determining whether the sound information includes feature base frequency information based on second preset information, wherein the second preset information includes a reference base frequency feature, and the feature base frequency information corresponds to the reference base frequency feature; and waking up a preset function of the smart device based on the multi-frequency tone when the sound information includes the feature base frequency information, wherein the waking up the preset function of the smart device based on the multi-frequency tone comprises:

determining whether the multi-frequency tone is wake up information based on energy information of the plurality of single-frequency tones; and waking up the preset function of the smart device when the multi-frequency tone is the wake up information, wherein the determining whether the multi-frequency tone is the wake up information based on the energy information of the plurality of single-frequency tones comprises:

performing framing on each single-frequency tone;

determining frame energy information of each frame of data of each single-frequency tone; and determining whether the multi-frequency tone is the wake up information based on the frame energy information of each single-frequency tone, wherein the frame energy information of the single-frequency tone is a ratio of point energy information of a frequency point of the single frequency tone to frequency band energy information of a frequency band corresponding to the frequency point.

* * * * *